United States Patent
Ingman et al.

(10) Patent No.: US 6,785,151 B2
(45) Date of Patent: Aug. 31, 2004

(54) QUASI-SYNCHRONOUS, MAGNETIC AMPLIFIER REGULATED DC-DC CONVERTER

(75) Inventors: Thomas M. Ingman, Somis, CA (US); Charles E. Mullett, Santa Paula, CA (US)

(73) Assignee: Condor D.C. Power Supplies, Inc., Oxnard, CA (US)

(*) Notice: Subject to any disclaimer, the term of this patent is extended or adjusted under 35 U.S.C. 154(b) by 0 days.

(21) Appl. No.: 10/388,854

(22) Filed: Mar. 14, 2003

(65) Prior Publication Data

US 2003/0174525 A1 Sep. 18, 2003

Related U.S. Application Data

(60) Provisional application No. 60/364,665, filed on Mar. 16, 2002.

(51) Int. Cl.[7] .................................................. H02M 7/68
(52) U.S. Cl. .......................................... 363/91; 363/127
(58) Field of Search ................................ 363/84, 89, 90, 363/91, 125, 127

(56) References Cited

U.S. PATENT DOCUMENTS

| | | | | |
|---|---|---|---|---|
| 4,811,187 A | * | 3/1989 | Nakajima et al. | 363/25 |
| 5,418,703 A | * | 5/1995 | Hitchcock et al. | 363/17 |
| 5,539,630 A | * | 7/1996 | Pietkiewicz et al. | 363/17 |
| 5,612,862 A | * | 3/1997 | Marusik et al. | 363/93 |
| 6,246,593 B1 | * | 6/2001 | Cheng | 363/17 |
| 6,297,970 B2 | * | 10/2001 | Hemena et al. | 363/21.06 |

* cited by examiner

Primary Examiner—Michael Sherry
Assistant Examiner—Gary L. Laxton
(74) Attorney, Agent, or Firm—William L. Johnson

(57) ABSTRACT

A circuit and method provides a regulated dc—dc power conversion. Active switches, saturable core inductors, and a diode are used in a quasi-synchronous circuit. During a part of the cycle (the "blocking interval") free-wheeling current is routed through free-wheeling diode while a saturable core inductor is in a high-impedance, blocking state. During other parts of the cycle an ac inverter voltage is rectified by active switching devices, preferably field effect transistors (FETs). The circuit provides regulated, low voltage outputs with low conversion losses.

20 Claims, 4 Drawing Sheets

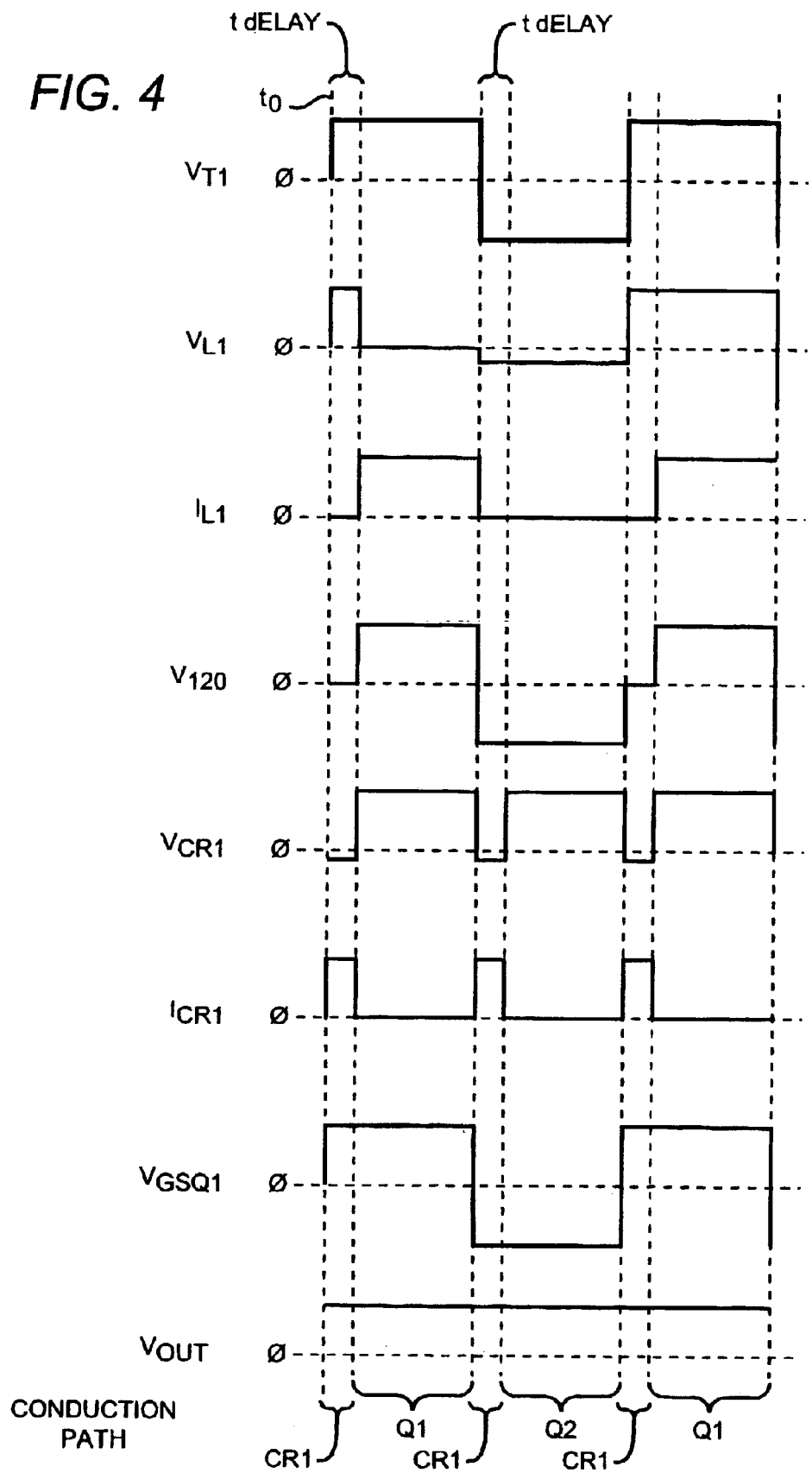

US 6,785,151 B2

QUASI-SYNCHRONOUS, MAGNETIC AMPLIFIER REGULATED DC-DC CONVERTER

This application claims priority of provisional application Ser. No. 60/364,665 filed on Mar. 16, 2002.

BACKGROUND OF THE INVENTION

1. Field of the Invention

This invention relates to switched-mode power supplies and more specifically to magnetic amplifier regulated dc—dc converters.

2. Description of the Related Art

In switched-mode power converters, synchronous rectifiers sometimes replace conventional semiconductor diodes, particularly in power supplies with low-voltage outputs. Such synchronous rectifiers typically employ bipolar or field-effect transistors (FETs) because their forward voltage drop can be much less than that of a typical semiconductor diode.

In other power supplies, saturable core inductors are often used as "magnetic amplifiers" or "mag-amps" to provide individual regulation of each output voltage in a multi-output power converter. Magnetic amplifier circuits provide a means of independently regulating each output circuit over a limited range, thus allowing independent regulation of each output voltage at a reasonable cost.

U.S. Pat. No. 4,811,187 to Nakajima et al. (1989) discloses a dc—dc converter using a full wave bridge circuit with mag-amp output regulation. The disclosed circuit is shown (with some simplification) in FIG. 1. A secondary winding of Transformer T delivers an ac square wave voltage to rectifying diodes D1, D2 and D3 via saturable core inductors 10 and 12. The saturable core inductors 10 and 12 are reset by control circuit 14 to block current to D1 and D2 during a part of the square wave cycle, accomplishing output voltage regulation as discussed in that patent. A third rectifier, D3, is required to provide a path for the current in Lout during a portion of the cycle when saturable core inductors 10 and 12 are in a non-conducting state. D3 is commonly referred to as a "freewheeling" diode, because it conducts current during a period when the current is "freewheeling" (driven by inductance of Lout). The circuit of Nakajima is simple but suffers from losses due to the voltage drops of D1, D2 and D3.

Mag-amp regulation is rarely combined with synchronous rectifiers. U.S. Pat. No. 6,297,970, issued Oct. 2, 2001 to Hemena, et al. discloses a single ended, forward converter circuit for providing multiple output voltages from a single input voltage. The disclosed circuit does incorporate a saturable core inductor as a delay element in a half-wave rectification circuit. However, Hemena's circuit relies on pulse width modulation of the input voltage to provide output voltage regulation. The mag-amp regulation added by Hemena serves to supply fine regulation of a secondary power output, but primary input regulation is still via pulse-width modulation of primary converter. This method requires fairly complex pulse generation and timing circuitry. Furthermore, a minimum load is required on the main output to keep secondary outputs in regulation.

The circuit of Hemena serves to provide zero voltage switching for the secondary-side switches over a limited range of load and supply variation. However, the circuit of Hemena does not provide zero voltage switching on the primary side. Thus, a significant source of power loss remains on the primary side.

SUMMARY OF THE INVENTION

In view of the above problems, the present invention includes both a circuit and a method.

The circuit of the invention is a regulated switching power supply circuit producing a regulated output voltage. The circuit includes: an inverter circuit that produces a substantially square-wave inverter voltage having two substantially equal half-cycles; at least two switching circuit branches, each having at least one saturable core inductor in series with a switching device having current switching terminals and a control terminal, said switching circuit branch coupled via a transformer to said inverter voltage; a magnetic amplifier control circuit which compares the output voltage to a voltage reference to produce an error signal, and which in response to the error signal provides variable reset current to said saturable core inductors to set the saturable core inductors to a current blocking state for a variable blocking interval during at least one of the half-cycles of said inverter voltage; and a freewheeling rectifier connected to provide a current path to bypass the saturable core inductors, the inverter circuit, and the active switching device during at least part of the blocking interval.

The invention also includes a method of producing a regulated dc voltage power output, which provides an output current. The method includes the steps of: Generating a substantially square-wave inverter voltage; Rectifying the inverter voltage by applying the inverter voltage to at least two switching devices while alternately activating one of the at least two switching devices during alternate half-cycles of the inverter voltage; delaying the application of the inverter voltage to the switching devices during a blocking interval by blocking current with a saturable core inductor; providing a freewheeling current path for the output current which bypasses the saturable core inductors, the inverter, and the switching devices during at least a portion of the blocking interval; and varying the duration of the blocking interval in response to an output voltage error signal, by feeding back reset current from an amplifier to the saturable core inductors to regulate output voltage, the reset current varying in direct relation with the error signal.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a timing diagram showing significant waveforms in the circuit of FIG. 1;

DETAILED DESCRIPTION OF THE INVENTION

The regulated power supply circuit of the invention includes a half or full bridge converter coupled through a transformer to one or more output circuits, each output circuit including a pair of magnetic amplifier delay devices (saturable core inductors). The magnetic amplifier delay devices are connected in series with a pair of switching devices operating as synchronous rectifiers. The outputs of the switching devices, as well as a "freewheeling" diode, provide current to an output inductor, which in turn provides output current for a load.

In accordance with the invention, the switching devices operate as synchronous rectifiers in combination with the non-synchronous, freewheeling diode. The freewheeling diode supplies current during a period ("blocking period") during which a saturable core inductor blocks current through the switching devices. As a result the converter operates in a quasi-synchronous mode. Thus, the quasi-synchronous rectification in accordance with the invention includes three phases: a first phase, during which current is blocked by a saturable core inductor in a reset condition, while current is maintained through a "freewheeling" (preferably Schottky) diode; a second phase during which the saturable core inductor is saturated and conducting current, along with the first switching device; and a third and fourth phase, complementary to the first and second phase.

Quasi-synchronous operation allows for simplified inverter circuitry and reduced sensitivity to timing problems; furthermore, zero voltage switching of all primary and secondary switching devices is enabled under all load conditions.

In a preferred embodiment, the switching devices comprise field effect transistors (FETs). For this reason, the invention preferably also includes an active anti-reset circuit which reduces or overcomes the reset effects otherwise associated with high capacitance switching devices (such as FETs). In the absence of such an active anti-reset device, high capacitance switching devices such as FETs tend to reset the saturable inductors associated with magnetic amplifiers, causing premature reset and reduced range of the mag-amp regulation.

Figure 2:
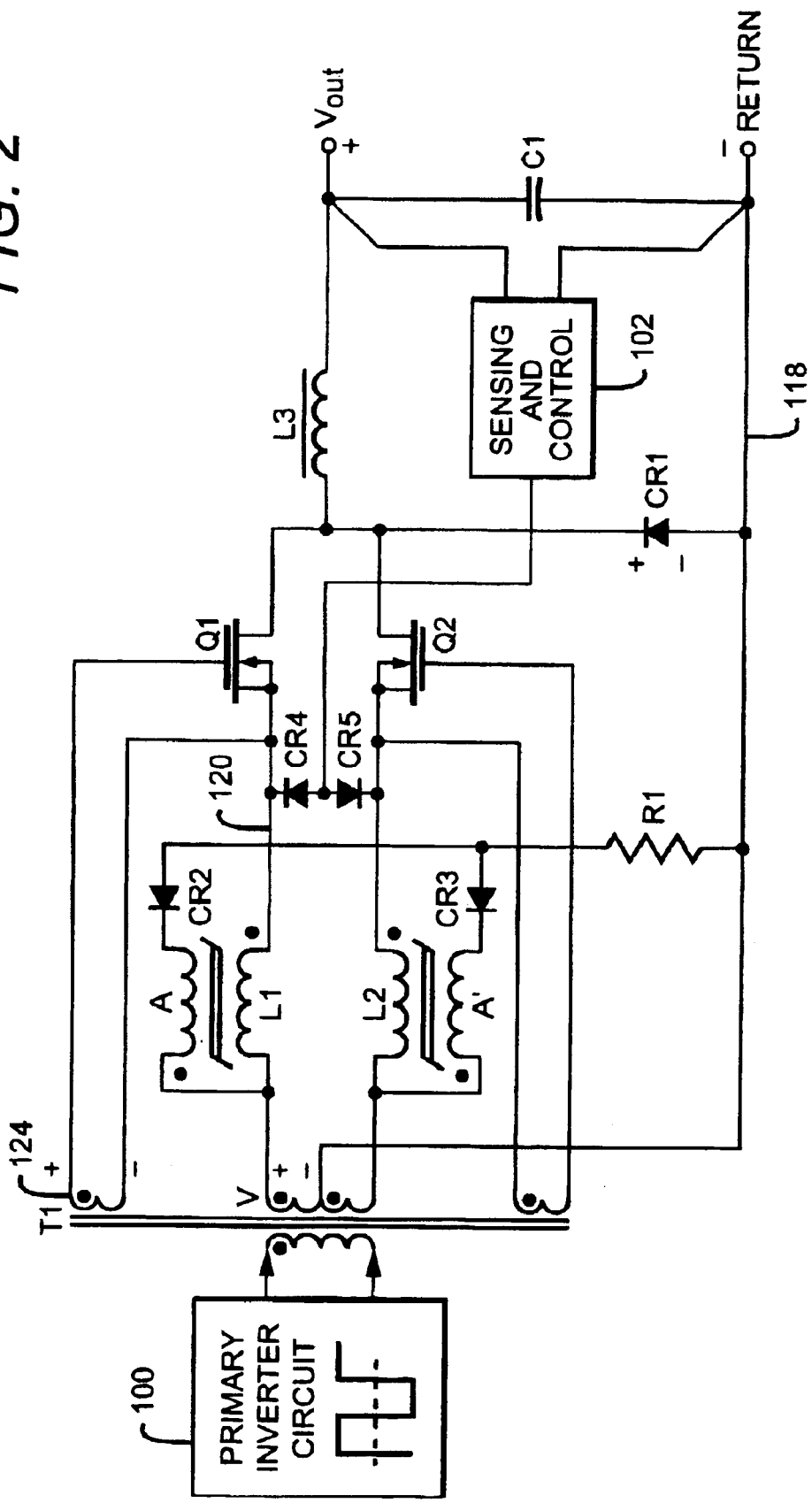
FIG. 2 is a schematic diagram of a circuit in accordance with a first embodiment of the invention.

FIG. 2 shows a circuit in accordance with one embodiment of the invention. Primary inverter circuit 100 drives the primary winding of transformer T1 with a substantially square wave. Various conventional inverter circuits could be used, including a half-bridge, full-bridge, phase-shifted bridge, or push-pull power stage; however, a inverter circuit with zero-voltage switching is preferred in accordance with one embodiment of the invention, described below in connection with FIG. 6. It is not necessary to provide a duty-cycle modulated inverter; a simple square wave inverter is preferred. It should be understood, however, that by "square wave" we mean a balanced waveform having two complementary half-cycles of substantially equal duration. Included in our definition is a waveform with some transition time, during which the polarity is neither at the positive or negative excursion, but slews between the two. Preferably, primary inverter waveforms in the frequency range from 50 kHz to 250 kHz are used, but other frequencies could be used depending on application requirements and the speed of the available switching devices.

A secondary, center-tapped winding of T1 is connected at opposite ends to saturable inductors L1 and L2. The saturable inductors L1 and L2 are controlled, on complementary half cycles, by the introduction of reset current through CR4 and CR5. The effect of the saturable inductors L1 and L2 is to variably delay the application of the voltage applied across switching devices Q1 and Q2. The saturable reactors L1 and L2, together with the sensing and control circuit 102 coupled to the reactors via CR4 and CR5, comprise a full-wave magnetic amplifier regulator ("mag-amp").

Switching devices Q1 and Q2 are preferably field effect transistors (FETs) and most preferably MOSFET switches. These provide lower losses and lower voltage drop as compared to conventional diode rectifiers. The gates of Q1 and Q2 are driven (on complementary half cycles) by auxiliary secondary windings (preferably also on T1). Output storage Inductor L3 smoothes the output current and averages a voltage waveform provided by the switching devices Q1 and Q2 (in series with L1 and L2). A rectifier ("freewheeling diode") CR1-most preferably a Schottky-barrier diode—provides a path for the L3 inductor current during a freewheeling phase (when one of the switching devices is turned off and the other is turned on but has current blocked by the series-connected saturable core inductor). CR1 also provides the important function of preventing inductor current from flowing into the saturable reactors between power pulses. A Schottky-barrier diode is preferred for CR1 in part because such diodes provide a low forward voltage drop and short recovery time (as compared with conventional semiconductor junction diodes).

It is greatly preferred that FETs with low on-resistance are employed for Q1 and Q2, to reduce power losses. However, FET devices have much higher capacitance than other rectifiers, for example Schottky rectifiers. The additional capacitance tends to induce parasitic reset of the saturable core inductors. The addition of anti-reset windings A and A' on the inductors L1 and L2 allow injection of anti-reset current (developed by the drop across R1 and passed via CR2 and CR3). The anti-reset current should be chosen of sufficient magnitude to cancel the parasitic reset due to the capacitance of Q1 and Q2. If the anti-reset circuit is omitted, the dynamic range of regulation will be more limited.

Optionally, output filtering capacitance C1 should be provided to filter the output voltage, as is well known in the art.

Figure 3:
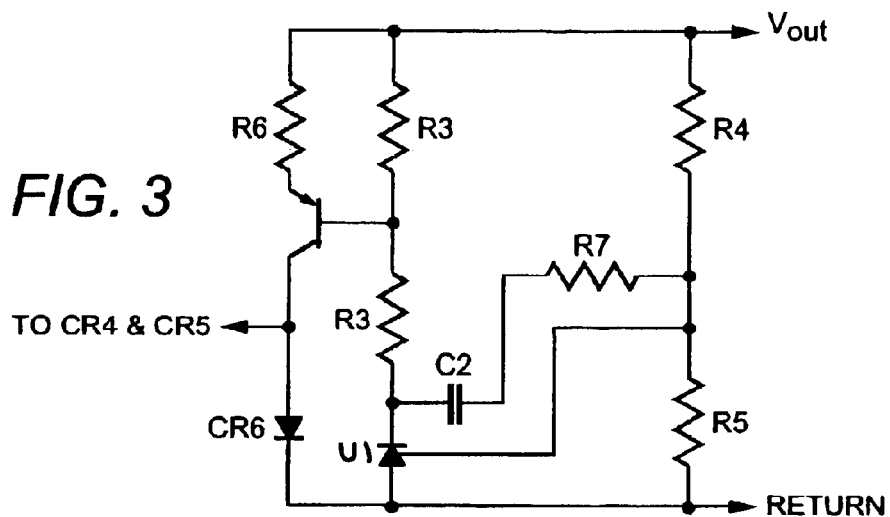
FIG. 3 is a schematic diagram of an amplifier circuit which is suitable for use as the magnetic amplifier feedback circuit in FIG. 1.

FIG. 3 shows a typical sensing and control circuit (suitable for use as magnetic amplifier feedback circuit 102 in FIG. 2). This circuit delivers reset current to the saturable reactors Q1 and Q2 in response to an error signal derived, for example, by comparing the output voltage Vout to a stable reference voltage. The stable reference voltage and an error amplifier are suitably contained in reference amplifier IC (U1). Reference pin 104 is connected to a voltage divider comprised of R4 and R5. Terminal 104 is connected (inside U1) to an inverting input of an error amplifier, with noninverting input internally connected to a stable dc voltage reference. The output of U1 is an open collector transistor (suitably a bipolar transistor) connected to resistor R3.

A transistor Q3, in combination with R2, R3 and R6 form a transconductance amplifier which produces reset current via diodes CR4 and CR5 to the saturable reactors (L1 and L2 in FIG. 2). Frequency compensation components C2 and R7 are suitably chosen to provide stable loop response; the actual circuit values are dependent on the load capacitance, output inductor, and gain of the saturable reactors L1 and L2. Suitable resistor values for a Vout of 3.3 volts are, in one realization of the circuit, as follows:

TABLE 1

| | |
|---|---|
| R2 | 620 ohm |
| R3 | 330 ohm |
| R4 | 2.05 k |
| R5 | 1.25 k |
| R6 | 24 ohm |

U1: TLV431 reference amplifier, reference voltage = 1.25 volts
Other control circuits are known which can also be equivalently used to regulate the output by controlling reset current.

Operation of the Circuit

FIG. 4 shows the timing of significant waveforms in the circuit of FIG. 2. Waveform VT1 shows the square wave voltage at the upper terminal of the secondary winding of T1 (voltage referenced to node 118, "return"). Waveform V120 shows the voltage at node 120 (again, referenced to node 118, "return"). Waveform VgsQ1 is the voltage from gate to source across Q1, and is provided by an auxiliary winding 124. VCR1 is the voltage across CR1 (polarity as indicated on FIG. 2). At time t0 the input waveform (square wave) goes high, turning on Q1 through winding 124. Simultaneously, voltage VT1 goes high. However, current (IL1) does not begin flowing through L1 until some (variable) time tdelay after t0, because of the blocking effect of the saturable core inductor L1. During this short interval (tdelay), any current flowing in L3 conducts through CR1, as it must because L1 is in a high-impedance, blocking state. After tdelay, L1 saturates causing current to flow through L1 and Q2.

During the complementary phase of the (square) input voltage, substantially the same sequence of switching occurs in the complementary branch of the circuit (L2 and Q2), with a similar blocking by L2 during tdelay.

It should be noted that the circuit operates with switches Q1 and Q2 in zero-voltage switching mode. Q1 and Q2 each turn on at the beginning of a delay period tdelay, during which a saturable core inductor (either L1 or L2) is in its high-impedance, or "blocking" state. This insures that no voltage appears across either Q1 or Q2 during its transition to the "on" state and results in zero-voltage switching operation of the synchronous rectifiers (Q1 and Q2). Note also that current flows through CR1 only for a relatively short portion (tdelay) of the cycle. The voltage Vcr1 times the current Icr1 represent power loss; however, the use of a Schottky-barrier diode for CR1 insures that this power loss is low.

The magnetic amplifier sensing and control circuit (102 in FIG. 2) operates as follows. It is usual in explanation of feedback circuits to assume some initial error. Thus, we assume that the output voltage is initially too high by some error voltage (Verr). The error voltage is amplified and causes an increase in reset current through CR4 and CR5 in FIG. 2. The increase in reset current lengthens the reset interval tdelay, which leads to a lower average output current feeding output inductor L3. Thus, the feedback and control circuit of 102 tends to cause the output voltage to track the reference voltage (internal to U1 in FIG. 3).

Figure 1:
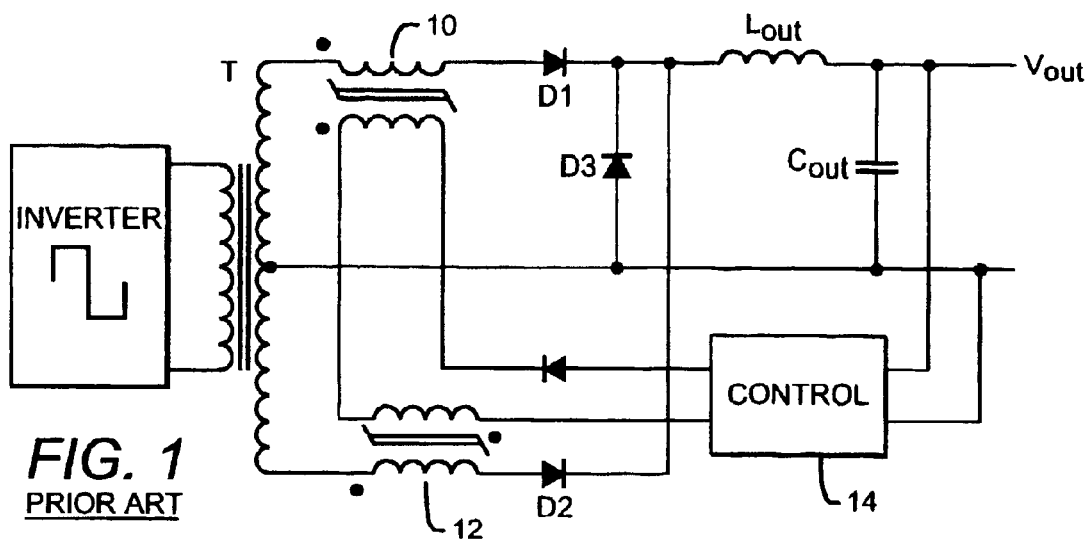
FIG. 1 is a schematic diagram of a prior art full-wave, mag-amp regulated dc—dc converter circuit.
Figure 5:
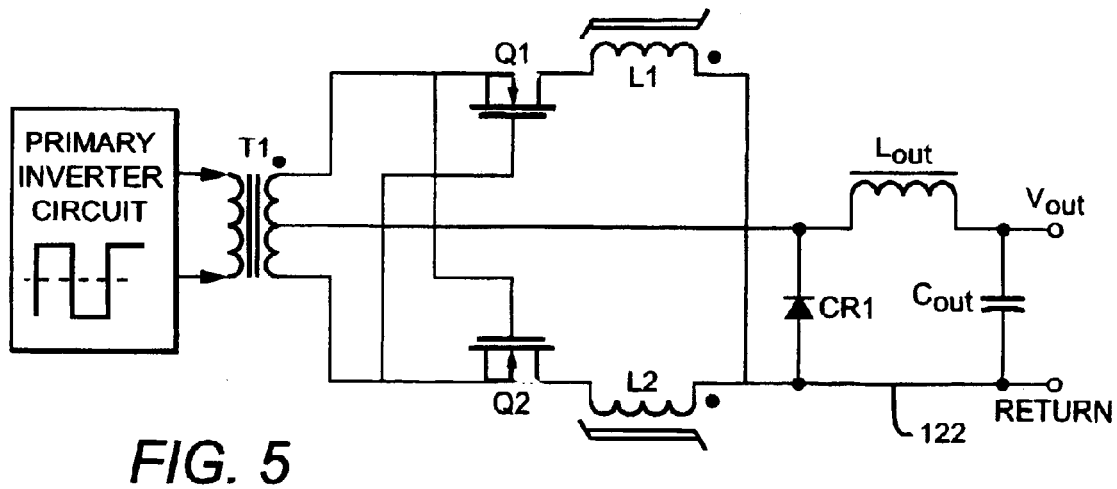
FIG. 5 is a schematic diagram of an alternate embodiment of the invention.

One alternate embodiment of the invention is shown in FIG. 5). In this embodiment, switching devices Q1 and Q2 are connected to opposite ends of the transformer secondary winding, with drains connected to the secondary. Dual saturable core inductors L1 and L2 are connected in series with the switching devices, but with the switching devices disposed between the saturable core inductors and the secondary. CR1 is connected as before to accommodate inductor output current during overlapping "off" times of the switching devices (in series with the saturable core inductors). Output inductor and optional filtering capacitor are connected as previously described. In the alternate circuit, the switching drive secondary windings 300 and 302 are not shown because they are optional. In accordance with one aspect of the invention the circuit of FIG. 5 can operate without the FET drive windings, in self-driven mode over a limited range of output voltages (which are dependent on gate voltage limitations). Reset and anti-reset circuits (not shown) are preferably provided as in FIG. 1 via an additional saturable core winding.

In another embodiment, in the circuit of FIG. 5 an auxiliary secondary drive winding could be used to drive the gates of Q1 and Q2.

According to the invention, a square wave primary inverter voltage (a symmetrical square waveform) is greatly preferred for several reasons. First, simple inverter circuits can easily be employed to generate square inverter waveforms. A of square wave inverter can easily be configured to provide zero-voltage switching operation for the switching devices on the primary side of T1.

Figure 6:
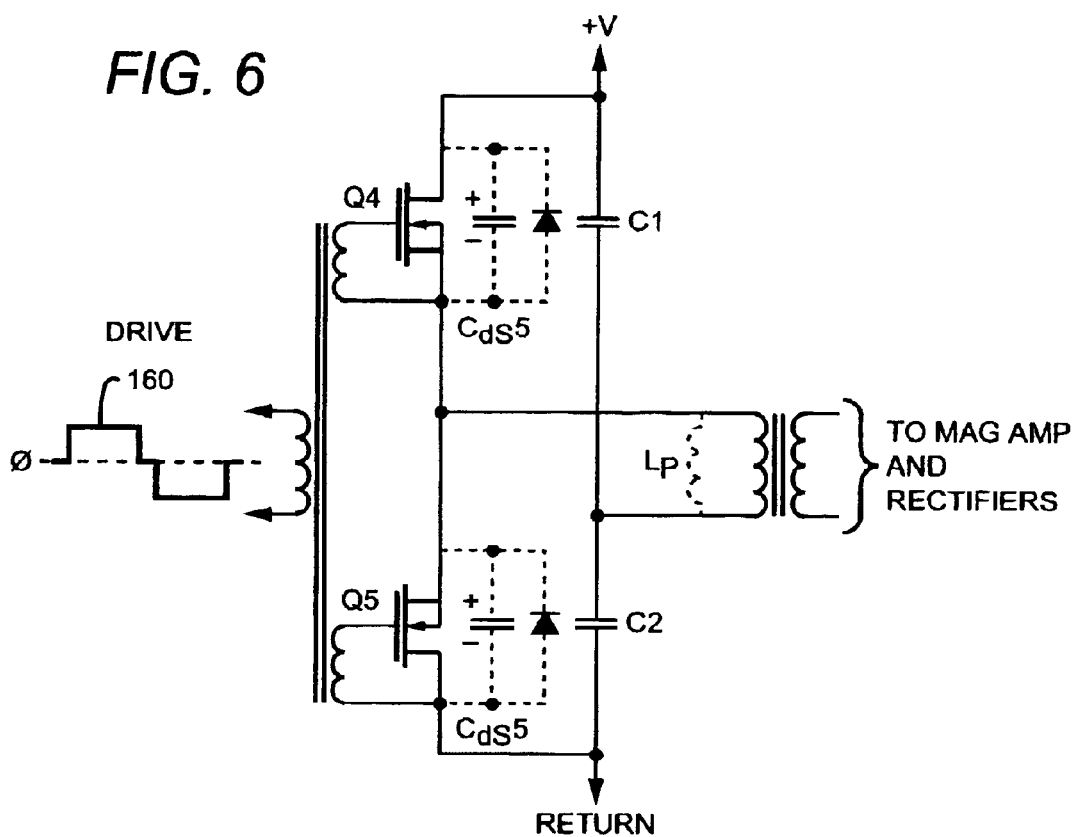
FIG. 6 is a schematic diagram of a zero-voltage switching primary dc-ac inverter circuit, suitable for use in supplying power to the circuits of FIG. 2 or FIG. 5.

A suitable primary inverter circuit is shown in FIG. 6. A pulse generator (not shown) provides balanced square wave 160, which drives Q4 and Q5. Note that the "square" wave drive 160 is not perfectly square but includes a small off or "dwell" time. Parasitic capacitance Cds4 and Cds5 are shown, and body diodes are shown. Provided that a balanced, square waveform (with suitable dwell time) is used to drive the primary switching devices Q4 and Q5, and further assuming that an appropriate inductance is selected for Lp, essentially zero-voltage switching is accomplished on the primary side. When Q4 is switched off, the parasitic capacitor Cds4 charges due to the current flowing in Lp (with polarity as shown). The charge across Q4 is stored until the next transition, when Q5 turns off, then is discharged by the current in Lp before Q4 turns on again. Essentially, charge gets exchanged back and forth between Cds4 and Cds5 due to the action of the current in Lp on each half cycle. Neither Q4 nor Q5 is turned on until such time as it has zero voltage across it.

A half-bridge inverter circuit running in an essentially square wave cycle can be easily configured to exhibit zero-voltage switching of its FET switches, as described above. While more complex primary inverter circuits are known that provide zero-voltage switching as well as variable duty cycle, use of a square wave cycle generally facilitates and simplifies the design of an efficient, zero-voltage switching primary inverter. The circuit of the invention can operate with either fixed or variable duty cycle; however, a suitable range of regulation can be achieved with a simple, square wave primary inverter. In contrast, the forward converter circuit of Hemena, cited above (in the Background of the Invention) relies on pulse width modulation of the primary inverter to provide adequate regulation. Hemena's converter requires more complex inverter circuitry yet fails to achieve zero-voltage switching of the primary inverter switches.

In addition to the other virtues of the invention, it eliminates any timing problems, including switching overlap which is difficult to eliminate in fully synchronous rectifier circuits. In the circuit of the invention any potential conduction overlap of the on times of Q1 and Q2 is prevented by the delay introduced by the saturable core inductors. Essentially, the saturable core inductors disconnect the switching devices during the primary transition times, as discussed above in connection with FIG. 2.

The "quasi-synchronous" operation of the present invention simplifies timing (as compared to a fully synchronous rectifier circuit). If the rectifier circuit were fully synchronous-that is, if the freewheeling diode CR1 were replaced by a synchronous switching device-accurate drive timing for that switching device would be difficult to produce. In the "quasi-synchronous" operation of the current invention, CR1 remains a diode; therefore, its recovery is self-switching, automatic, and cannot be mis-timed. In a preferred embodiment CR1 is a low voltage-drop Schottky rectifier and does not compromise efficiency significantly, since CR1 is only on for a small part of the rectification cycle. Stated differently, fully synchronous rectification would require three switching devices: one for each half cycle of the power pulses, and one for the freewheeling cycle. Such a circuit would be sensitive to timing difficulties. Thus, the "quasi-synchronous" mode of operation is a reasonable compromise, offering most of the benefits of synchronous rectification with lesser complexity.

Another advantage of the circuit of the invention is that it is very quiet, producing almost no voltage spikes or ringing on both primary and secondary sides of T1. As a result, virtually no spikes or ringing occur across the FETs. Thus, no "snubbing" circuits are required across T1, Q1 or Q2 to reduce ringing.

Yet another advantage of the circuit of the invention is that FET drive can be derived directly from the main power transformer with a small secondary winding. This is particularly advantageous for multi-output designs: a single transformer can provide several isolated and independently regulated outputs without significant interaction. In such configurations, the circuit of the invention provides operation down to zero load on all outputs, without interaction among the outputs.

Still another characteristic of the present circuit is that zero-voltage primary switching is not impeded under any secondary load conditions. This feature emerges because the delay imposed by the saturable core inductors essentially decouples the load during critical transitions on the primary side.

It should also be noted that negative outputs can be realized while maintaining a grounded center tap on T1, by reversing source and drain) on Q1 and Q2, reversing CR2 and CR3, and making appropriate changes in the control circuit. The drive winding returns should remain connected to the sources of Q1 and Q2; but they devices can remain N-channel devices, which have a much lower Rdson than-P-channel devices.

Method of the Invention

Figure 7:
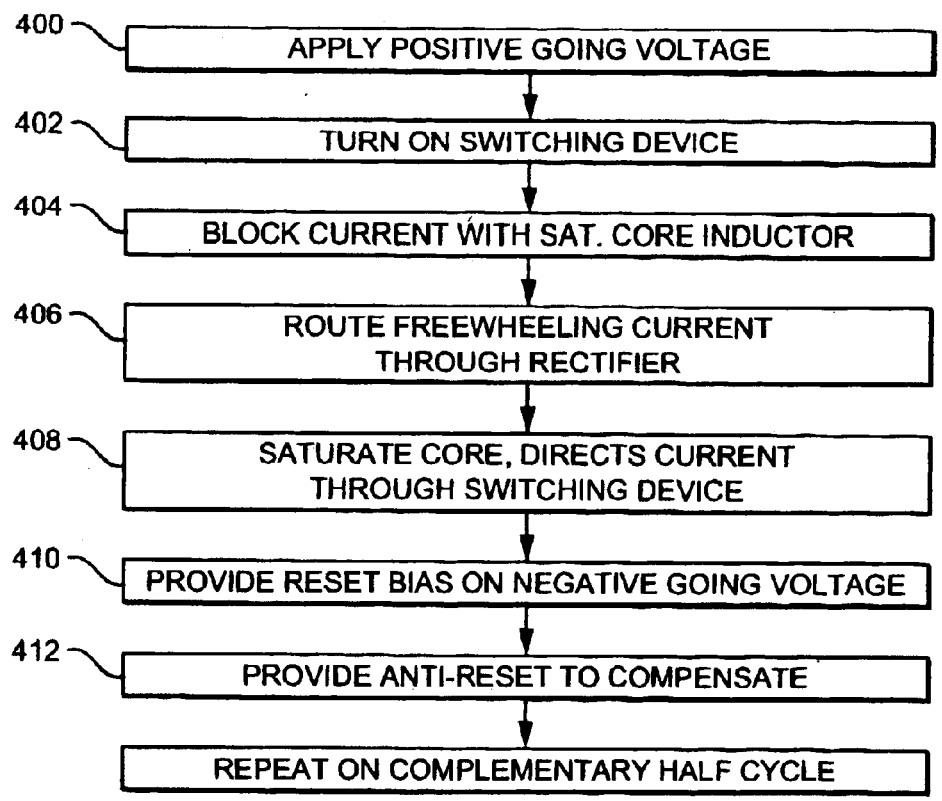
FIG. 7 is a flow diagram showing steps in accordance with a method of the invention.

FIG. 7 shows steps of a method in accordance with the invention as depicted in FIG. 2. The method produces a regulated dc power supply by the following steps: First, a primary switching circuit drives (step 400) a transformer with a substantially square waveform, which tends to produce a voltage across a secondary winding of the transformer. The square waveform has two half cycles, each occupying about 50% of the period of the waveform. During the first half cycle, a first switching device is turned on (step 402). For an initial blocking time interval, current through the first switching device is initially blocked (step 404) by a first saturable core inductor. During at least a part of the blocking interval, freewheeling output inductor current is routed (step 406) through a rectifier (preferably a Schottky diode). After the saturable core inductor saturates, current begins to flow through the first switching device step (408). At the end of a half-cycle, the waveform reverses polarity and the above steps are repeated on the complementary phase of the waveform, using a second switching device and second saturable core inductor. The output nodes of the first and second switching devices are connected to an output inductor to provide filtered output current.

During the second half cycle, a magnetic amplifier control circuit provides reset bias (step 410) to the first saturable core inductor; the amount of reset bias is varied in response to an error signal derived by comparing actual output voltage to a desired output voltage, to produce a voltage regulated output. In addition, active anti-reset current is applied (step 412) to the saturable core inductor via a secondary winding on the inductor, in quantity sufficient to substantially compensate for parasitic capacitance of the first switching device.

Similarly, during the first half cycle a magnetic amplifier control circuit provides reset bias (step 410) to the second saturable core inductor. The amount of reset bias is varied in response to an error signal derived by comparing actual output voltage to a desired output voltage, to produce a voltage regulated output. In addition, active anti-reset current is applied (step 412) to the second saturable core inductor via a secondary winding on the second saturable core inductor, in quantity sufficient to substantially compensate for parasitic capacitance of the second switching device.

Generalizing, the method of the invention includes the steps of providing a substantially square voltage to a transformer; applying a transformed square voltage waveform to at least one saturable core inductor in series with a switching device; switching the switching device synchronously during half cycles of the square waveform to rectify the waveform and produce output current; delaying the application of the square voltage waveform to the switching device by blocking current with the at least one saturable core inductor during an initial blocking interval of the half cycle; providing an alternate path for output inductor current during the blocking interval, preferably through a Schottky diode; applying reset bias to the saturable core inductor from an error amplifier which compares the actual output voltage to a reference voltage; and (preferably) applying anti-reset bias to the saturable core inductor via a secondary inductor winding, in an amount sufficient to compensate for parasitic capacitance of the switching device.

Most preferably the above steps are performed on complementary half cycles by complementary switching devices and saturable core inductors, in a full-wave or bridge topology.

It should be noted that it is preferable that the method of the invention employ a square wave primary inverter waveform, in which duty cycle is fixed at 50/50 distribution. Square wave operation is preferred because the required waveforms are simple to generate, as discussed above in connection with FIG. 6.

While several illustrative embodiments of the invention have been shown and described, numerous variations and alternate embodiments will occur to those skilled in the art. Single or multiple output power converters can be realized, either on common transformer cores or on multiple cores. Polarities could be reversed. The order of the transformer secondary winding, saturable core inductors, and switching devices can be rearranged in various permutations consistent with the method of the invention, yielding circuits which are equivalent but which may appear different in topology. A single power winding could be used to derive multiple voltage outputs. Either N-channel or P-channel devices could be employed, with appropriate changes in circuit polarity. Multiple switching devices could be employed either in parallel or in series. Multiphase (three phase and more) circuits could be employed. Although FETs are shown as the switching devices, other switching devices could be employed including but not limited to bipolar transistors. At the present FETs are preferred for their low price, low voltage drop, high gate impedance, adequate switching speed and thermal qualities. Future advances in semiconductor technology could make other switching devices available which could be employed as switching devices, substantial equivalents to the FETs shown. Any of a variety of methods could be used to drive the gates of the FETs (or the control terminals of analogous switching devices). Other control and anti-reset circuits could be used. Such variations and alternate embodiments are contemplated, and can be made without departing from the spirit and scope of the invention as defined in the appended claims.

We claim:

1. A regulated switching power supply circuit producing a regulated output voltage, comprising:

an inverter circuit that produces an alternating inverter voltage having two half-cycles;

at least two switching circuit branches, each comprising at least one saturable core inductor in series with a switching device having current switching terminals and a control terminal, each of said switching circuit branches coupled via a transformer to said inverter voltage;

a magnetic amplifier control circuit which compares the output voltage to a voltage reference to produce an error signal, and which in response to said error signal provides variable reset current to said saturable core inductors to set said saturable core inductors to a current blocking state for a variable blocking interval during at least one of said half-cycles of said inverter voltage; and a freewheeling rectifier connected to bypass said said switching branches and transformer during at least part of said variable blocking interval.

2. The regulated switching power supply circuit of claim 1, further comprising:

an anti-reset circuit, coupled to said saturable core inductor, which provides anti-reset bias to said saturable core in sufficient quantity to compensate for an inherent capacitance of said active switching device.

3. The regulated switching power supply circuit of claim 1, wherein said switching device comprises a field effect transistor (FET).

4. The regulated switching power supply circuit of claim 1, wherein said freewheeling rectifier comprises a Schottky-Barrier Diode.

5. The regulated switching power supply circuit of claim 4, wherein said alternating inverter voltage is coupled to said switching circuit branches via said transformer, and wherein said saturable core inductor in each of said switching circuit branches is coupled to a secondary winding of said transformer.

6. The regulated switching power supply of claim 5 wherein said alternating inverter voltage is coupled to said series combination via said transformer, and wherein said switching device is coupled to a secondary winding of said transformer.

7. The regulated switching power supply of claim 6, wherein said control terminal of said at least one switching device is driven from an auxiliary secondary winding of said transformer.

8. The regulated switching power supply of claim 1 wherein said anti-reset circuit provides anti reset bias to said saturable core inductor via a secondary winding on said saturable core inductor.

9. The regulated switching power supply of claim 8 wherein said magnetic amplifier control circuit is the sole circuit for regulating output voltage.

10. The regulated switching power supply of claim 1, wherein said alternating inverter voltage is a substantially square wave inverter voltage.

11. The regulated switching power supply of claim 9 wherein said inverter circuit produces said substantially square wave inverter voltage by switching a dc voltage with at least one primary inverter switch which turns on at a time when the voltage across said primary inverter switch is substantially zero, thereby achieving "zero voltage switching."

12. A method of producing a regulated dc voltage power output, which provides an output current, comprising the steps of:

generating an alternating inverter voltage;

rectifying said inverter voltage by applying said inverter voltage to at least two switching devices while alternately activating ones of at least two switching devices during alternate half-cycles of said inverter voltage;

delaying the application of said inverter voltage to said switching devices during a blocking interval by blocking current with a saturable core inductor;

providing a freewheeling current path for the output current which bypasses said saturable core inductors and said switching devices during at least a portion of said blocking interval; and varying the duration of said blocking interval in response to an output voltage error signal, by feeding back reset current from an amplifier to said saturable core inductors to regulate output voltage, said reset current varying in direct relation with said error signal.

13. The method of claim 12 in which said freewheeling current path is through a Schottky-barrier diode.

14. The method of claim 12, further comprising the step:

providing anti-reset bias to said saturable core inductor in amount sufficient to compensate for parasitic capacitance of said switching devices.

15. The method of claim 12 wherein said step of generating an alternating inverter voltage comprises switching a voltage by turning on a primary inverter switching device, coupled to a primary side of a transformer, at a time when zero voltage is applied across said primary inverter switching device, thereby providing zero-voltage switching in said primary inverter switching device.

16. The method of claim 12 wherein said switching devices comprise field effect transistors (FETs).

17. The method of claim 16, wherein said freewheeling current path comprises a Schottky-barrier diode.

18. The method of claim 17 wherein said switching devices are activated by driving the gates of said switching devices from a secondary winding of a transformer;

and wherein a primary winding of said transformer is driven by said inverter voltage.

19. A method of producing a regulated dc power output, comprising the steps of:

providing an alternating inverter waveform;

applying said inverter waveform to at least one saturable core inductor in series with a switching device;

switching said switching device synchronously during half cycles of the alternating waveform to rectify the waveform and produce output current;

delaying the application of said alternating voltage waveform to said switching device during a blocking interval of said half cycle;

bypassing said saturable core inductor and said switching device by providing an alternate current path for freewheeling current during said blocking interval;

applying reset bias to said saturable core inductor from an error amplifier which compares the actual output voltage to a reference voltage; and applying anti-reset bias to said saturable core inductor via a secondary inductor winding, in an amount sufficient to compensate for a parasitic capacitance of said switching device.

20. The method of claim 19, wherein said alternate current path is through a Schottky barrier diode.

* * * * *